W. A. RIDDELL.
FINDER.
APPLICATION FILED JAN. 20, 1919.
1,437,817.
Patented Dec. 5, 1922.
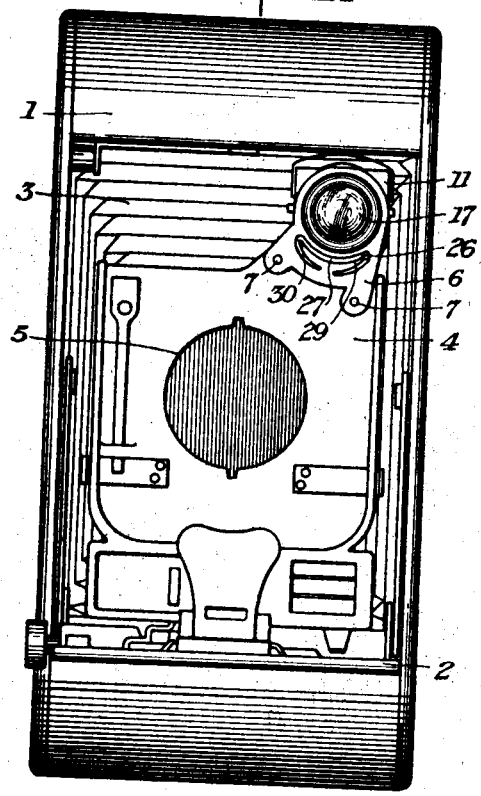
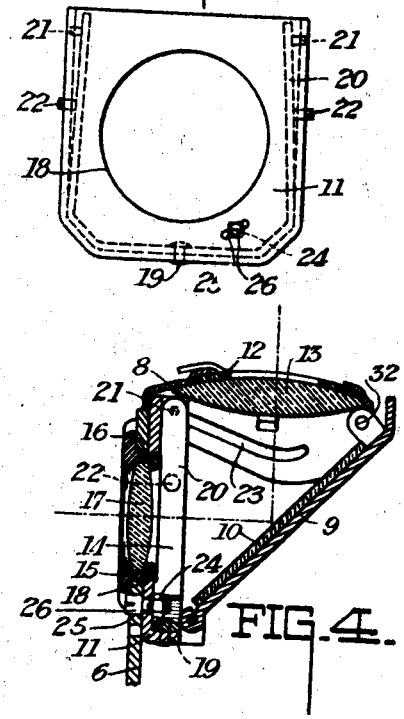
WITNESSES:
Donald H. Stewart
INVENTOR.
William A. Riddell
BY Roy L. Stinchfield
Newton N. Perrins
ATTORNEYS.

Patented Dec. 5, 1922.

1,437,817

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

FINDER.

Application filed January 20, 1919. Serial No. 272,189.

*To all whom it may concern:*

Be it known that I, WILLIAM A. RIDDELL, a citizen of the United States of America, residing at Rochester, in the county of Monroe and State of New York, have invented certain new and useful Improvements in Finders, of which the following is a full, clear, and exact specification.

My present invention relates to finders for photographic cameras and particularly to the type carried by small folding cameras where compactness is an essential and where ease and accuracy in assembly, adjustment, repair and cleaning are most desirable.

The objects of my invention are to provide such a finder that will fold compactly, that may be easily opened for repair and cleaning, that is adjustable to two positions corresponding to the vertical and horizontal positions of the camera, and in which the optical system may be quickly and accurately positioned and corrected to correspond to the field of the camera, and which will be held securely in the two viewing positions. Other objects will appear in the following description.

Reference is made to the accompanying drawings in which:

Fig. 1 is a front elevation of a camera showing the finder mounted on the lens board;

Fig. 2 is a front elevation of the finder and its supporting plate;

Fig. 3 is a view of the front plate of the movable finder member and its associated parts;

Fig. 4 is a section taken on the line 4—4 of Fig. 2, and

Fig. 5 is a side elevation of the finder and its supporting plate.

In all the figures the same characters are used to indicate the same parts.

The camera case 1 has a folding front or bed 2, the edge only of which is shown, and the usual bellows 3 connects the lens board 4 with the back. In the lens board is an opening 5 into which any suitable lens and shutter may be mounted. As the camera is shown merely to illustrate the use of my invention broadly, no details as to description thereof will be given. Upon one upper corner of the lens board 4 the finder supporting plate 6 is mounted as by rivets 7. Upon this is pivotally supported the movable finder which comprises three hingedly rotated parts, an upper metallic casing 8 and frame 9 supporting mirror 10 and a front plate 11. The part 8 holds in place the upper lens 13 which is covered by a rotatable mask 12. The front plate 11 has a flange 14 extending around its sides and base and a central aperture 18 into which is screw threaded a lens mount 15 containing the lens 17, so that the mount and plate 11 turn together. Secured by a rivet 19 to the center of the base of the flange 14 is a U-shaped spring member 20 having a pair of upper lugs 21 and lower lugs 22 extending through suitable apertures in the flange 14 and the sides of the support. The lugs 21 engage in slots 23 in the casing 8. The lugs 22 act as buttons or finger pieces which may be pressed by the fingers to cause the lugs 21 at the ends of the arms of the U-shaped spring 20 to move inwardly to such an extent that the ends of lugs 21 will be within the surface of flanges 14, as shown clearly in Fig. 3. They will thus disengage slots 23 in the frame 8 and permit this member to be swung upwardly on its pivot 32, to permit ready access to the under surface of lens 13. As the frame 9 is also pivoted at 31, it is evident that the whole finder is readily opened up, making cleaning of the mirror and of both lenses, or the adjustment or repair of the parts of the finder, an easy matter. Slot 25 is formed in the front plate 11, and in this slot is secured a threaded screw 26 by means of a nut 24. It is apparent that the position of this screw may be adjusted to any point in the length of the slot.

In the supporting plate 6 is a central aperture 16 which is adapted to fit rotatably upon the mount 15, so that the finder as a whole is pivotally supported on the plate 6 by reason of the pivoted relation between these two parts. In this supporting plate is struck an arcuate main slot 27 and two secondary slots 28, the ends of which merge with the ends of the arcuate slot. There are thus defined two tongues which, since the plate is made of sheet metal, have a certain amount of resilience. In the ends of the tongues 29 small notches 30 are fitted. The head of screw 26 forms a projection which slides in the arcuate slot 27 as the finder is turned from one of its positions to the other. As this projects nearest the end of the slot, it slightly bears on the end of the tongue, forcing it down until the projection snaps into the notch 30, where it is securely held in its terminal position. The mirror support 9 is hingedly connected at 31 to the front plate of the finder and at 32 to the upper frame 8. When the camera is closed, the finder will fold up by reason of the hinges 31 and 32 and the sliding relation between the lugs 21 and slots 23.

In the making of finders hitherto it has been necessary to mount the lenses with a considerable degree of care, in order to insure that the optical system of the finder will be properly centered with respect to the field of view of the camera lens. But, I have discovered that the system can be accurately centered in a much more convenient way and in a shorter time by making the projection 26 adjustable, so that after the finder is assembled the movement of the projection will alter the terminal positions of the finder in such a way that its center can be fixed as desired at that time. The resilient catches for holding the projection in its terminal position also insure that the finder will be securely held at the correct point unless purposely dislodged therefrom.

The image of the object is viewed by the user of the camera through the optical system of the finder, comprising two lenses and a mirror, the dot and dash line in Fig. 4 indicating the center of the optical system. Should one of the lenses, particularly the front lens, be inaccurately mounted, as can very easily happen since these lenses are of very cheap construction, the optical system will be in error, and by the adjustment of the finder as a whole, by the movement of the projection 26, a position can be reached, such that when the finder is in its terminal positions with the projection 26 engaged in the notch 30 the center of the field presented to the eye of the user will correspond to the center of the field of the main lens.

It will be noted that the length of the arcuate slot 27 is such that the terminal positions of the projection are exactly ninety degrees apart. The ends of the slot are abutments having a fixed relation to each other. It is not necessary, therefore, in mounting a finder, to adjust separately two terminal abutments to determine the proper positions for the finder but the adjustment of a single element, the projection 26, automatically adjusts the positions of both abutments relative to the projection. Its terminal positions are necessarily ninety degrees apart and when one is accurately determined, the other will also be correct.

Having thus described my invention, what I claim as new and desire to secure by Letters Patent is:

1. In combination, a camera, a slotted plate carried thereby, and a finder mounted on said plate and having a plurality of positions and carrying a projection adjustably positioned on the finder and which moves in the slot as the finder as a whole is moved from one position to another, the adjustability of the projection permitting correction of optical error in the finder.

2. In combination, a camera, a plate with an arcuate slot carried by the camera, and a finder pivotally mounted on said plate and having two proper terminal positions and carrying a single projection adjustably positioned thereon which moves in the slot as the finder is turned from one position to another and engages the end walls of the slot to determine the proper terminal positions of the finder.

3. In combination, a camera, a plate carried thereby, a finder rotatably mounted on said plate and having two positions and carrying a projection, the plate having an arcuate slot in which said projection slides as the finder is turned from one position to the other, one wall at each end of the slot being resilient and having a terminal notch into which the projection is adapted to fit, whereby the finder is securely held in proper position.

4. In combination, a camera, a supporting plate carried thereby, a finder movably mounted on said plate and having two positions and carrying an adjustably positioned projection, the plate having a slot in which the projection engages as the finder is moved from one position to the other, one wall at each end of the slot being resilient and adapted to hold the projection in its proper terminal position.

5. In combination, a camera, a supporting plate carried thereby and a finder movably mounted on the plate and having a plurality of positions, the finder having a slot on its front wall in which a projection is adjustably positioned, the supporting plate having a slot in which the projection is adapted to engage as the finder is moved from one position to another, the adjustability of the projection permitting the correction of errors of the optical system of the finder.

6. In combination, a camera, a plate carried thereby, a finder rotatably mounted on said plate and having two positions and carrying a projection adjustably positioned thereon, the plate having a slot in which said projection slides as the finder is moved from one position to the other, one wall at each end of the slot being resilient and having a terminal notch into which the projection is adapted to engage to hold the finder securely in one of its positions, the adjustability of the projection facilitating the position of the parts so that when the projection engages in one of the notches the optical system of the finder will be properly centered.

7. In combination, a camera, a plate carried thereby and having struck therefrom a main slot and two secondary slots, the material between the secondary slots and one wall of the main slot forming two resilient tongues, each tongue having at its end a notch, which is also at one end of the main slot, and a finder mounted on said plate and having two positions and carrying a projection which slidably engages the main slot as the finder is moved from one position to the other, and which engages a notch at either end of the main slot to hold the finder securely in one of the other of its positions.

8. In combination, a camera, a supporting plate thereon having a round aperture and a finder having a front plate from which a lens mount projects, the mount engaging pivotally in the said aperture, and a projection adjustably positioned on the front plate, the supporting plate having an arcuate slot in which the projection slides as the finder is turned on the lens mount as a pivot, one wall at each end of the slot being resilient and having a terminal notch into which the projection is adapted to engage, the adjustability of the projection permitting the parts to be so positioned, that when the projection engages in one of the notches, the optical system of the finder will be properly centered.

9. In combination, a camera, a support having abutments thereon, a finder movable to a plurality of positions on the support and having a single projection adjustable in position on the finder, the movement of the projection being limited by said abutments.

10. A camera having a support and a finder movable relatively thereto to a plurality of positions, one of said elements having a single projection adjustable in position thereon and the other a plurality of abutments, the relative movement of the support and finder being limited by the engagement of the projection with the abutments.

11. In combination a camera, a plate carried thereby, a finder rotatably mounted on the plate and having two positions, one of said elements having a projection adjustable in position thereon, and the other having two abutments, the positions of the finder being determined by the engagement of the projection with the abutments.

12. In combination a camera, a plate carried thereby, a finder rotatably mounted on the plate and having two positions, one of said elements having a projection adjustable in position thereon, and the other having two abutments, the positions of the finder being determined by the engagement of the projection with the abutments, and resilient means to maintain the finder in such position.

13. A finder for photographic cameras having a lens carrying frame pivotally connected at one edge thereto and having apertured flanges, a separate U shaped spring carried by the body of the finder and carrying near the end of each arm a lug adapted to engage an aperture in one of the flanges, the spring arms being movable to a position such that the lugs will be disengaged from the apertures to permit the frame to be swung away from the body of the camera.

14. A folding finder for photographic cameras having a front lens carrying frame, a mirror carrying frame pivotally connected at one edge to the bottom of the front frame, an upper lens carrying frame pivotally connected at one edge to an edge of the mirror carrying frame and having side flanges with longitudinal slots, spring arms separate from the front frame mounted one on each side of the front frame and each carrying a lug near its end adapted to engage in the slot in the corresponding flange to guide the movement of the upper frame in the folding of the camera and movable out of engagement with such slot to permit the upper frame to be swung away from the body of the finder to afford ready access thereto.

15. A finder for photographic cameras having a body portion and an upper lens carrying frame, the frame being pivotally connected at one edge to said body, and having flanges with apertures therein, a U shaped spring mounted on said body and carrying near the end of its arms lugs adapted to engage the apertures in the flanges, and carrying also other lugs extending to a position exterior of the finder whereby they may be readily manipulated to free the first named lugs from said apertures.

Signed at Rochester, New York, this 18th day of January 1919.

WILLIAM A. RIDDELL.